United States Patent
Robinson

(10) Patent No.: US 10,000,046 B2
(45) Date of Patent: Jun. 19, 2018

(54) METHODS FOR CREATING THICK LAMINATE STRUCTURES

(71) Applicant: ROHR, INC., Chula Vista, CA (US)

(72) Inventor: John W. Robinson, Fernandina Beach, FL (US)

(73) Assignee: ROHR, INC., Chula Vista, CA (US)

( * ) Notice: Subject to any disclaimer, the term of this patent is extended or adjusted under 35 U.S.C. 154(b) by 1291 days.

(21) Appl. No.: 14/047,651

(22) Filed: Oct. 7, 2013

(65) Prior Publication Data

US 2016/0375667 A1    Dec. 29, 2016

(51) Int. Cl.
| | | |
|---|---|---|
| *B32B 41/00* | (2006.01) | |
| *B32B 37/04* | (2006.01) | |
| *C08J 5/24* | (2006.01) | |
| *B32B 19/02* | (2006.01) | |
| *B32B 27/38* | (2006.01) | |
| *B32B 37/06* | (2006.01) | |
| *B32B 38/00* | (2006.01) | |

(52) U.S. Cl.
CPC .............. *B32B 37/04* (2013.01); *B32B 19/02* (2013.01); *B32B 27/38* (2013.01); *B32B 37/06* (2013.01); *B32B 41/00* (2013.01); *C08J 5/24* (2013.01); *B32B 2038/0076* (2013.01); *B32B 2260/023* (2013.01); *B32B 2260/046* (2013.01); *B32B 2262/101* (2013.01); *B32B 2305/076* (2013.01); *B32B 2305/188* (2013.01); *B32B 2363/00* (2013.01); *C08J 2363/00* (2013.01)

(58) Field of Classification Search
CPC ......... B32B 37/04; B32B 19/02; B32B 27/38; B32B 37/06; B32B 41/00; B32B 2262/101; B32B 2260/023; B32B 2260/046; B32B 2305/076; B32B 2305/188; B32B 2363/00; C08J 5/24; C08J 2363/00

USPC ................... 156/64, 350, 378, 379
See application file for complete search history.

(56) References Cited

U.S. PATENT DOCUMENTS

| | | | | |
|---|---|---|---|---|
| 5,721,177 A | * | 2/1998 | Frank | B29C 43/006 428/304.4 |
| 2001/0006264 A1 | * | 7/2001 | Wit | B29C 35/0288 264/40.1 |
| 2009/0069490 A1 | * | 3/2009 | Ogura | C08G 59/621 524/540 |

FOREIGN PATENT DOCUMENTS

| | | |
|---|---|---|
| CN | 10146276 | 6/2009 |
| EP | 0158343 | 10/1985 |

(Continued)

OTHER PUBLICATIONS

Search Report dated Apr. 30, 2015 in United Kingdom Application No. GB1417659.8.

(Continued)

*Primary Examiner* — Michael N Orlando
*Assistant Examiner* — Joshel Rivera
(74) *Attorney, Agent, or Firm* — Snell & Wilmer L.L.P.

(57) ABSTRACT

Methods of creating thick composite structures are provided. The methods may be applied to two or more prepreg structures of composite materials to form laminate structures that are thicker than approximately five (5) inches without excessive exothermic events resulting in inconsistent cure and high residual stresses. The method may include heating a first sheet to achieve a specified increase in resin viscosity. In response to achieving the specified resin viscosity, a second portion of composite material may be applied to the first portion. The assembly may be heated to create a laminate structure which is chemically bonded with no interface.

13 Claims, 6 Drawing Sheets

(56) References Cited

FOREIGN PATENT DOCUMENTS

| EP | 2311892 | 4/2011 |
|----|---------|--------|
| WO | 0242376 | 5/2002 |
| WO | 2013093065 | 6/2013 |

OTHER PUBLICATIONS

Travis A. Bogetti, et al., "Two-Dimensional Cure Simulation of Thick Thermosetting Composites," Journal of Composite Materials, Mar. 1991, vol. 25, Technomic Publishing Co., Inc., pp. 239-273.
Travis A. Bogetti, et al., "Process-Induced Stress and Deformation in Thick-Section Thermostat Composite Laminates," Journal of Composite Materials, 1992, vol. 26, No. 5, Technomic Publishing Co., Inc., pp. 626-660.

\* cited by examiner

METHODS FOR CREATING THICK LAMINATE STRUCTURES

FIELD

The present disclosure relates to fabricating thick composite structures, and more specifically, to thick composite structures without using any adhesives in fabricating the structure.

BACKGROUND

Creating thick laminate structures can be time consuming. For example, a layup process for creating thick laminate structures may comprise adhering or gluing many thin laminates together. The layup process typically includes a preparation step performed on the surface between each laminate structure, which can be labor and/or time intensive. After a laminate structure is bonded, the layup process typically includes curing the adhesive. Moreover, if the layup process is performed in one step for the total thickness, the curing process can introduce residual stress and high temperatures resulting in excessive thermal load.

SUMMARY

Methods of creating thick composite structures are provided. In various embodiments, the method may comprise: heating a first prepreg structure to a first temperature, wherein the first prepreg structure comprises a resin that begins to flow and advances slightly in cure in response to the heating to the first temperature; determining a thickness of the first prepreg structure, the first prepreg structure consolidating in response to the first prepreg structure being exposed to the first temperature; monitoring, in real time, the viscosity of resin of the first prepreg structure; determining based on viscosity when the first molecular weight of the resin of the first prepreg structure increases; applying a second prepreg structure to the first prepreg structure, wherein the first prepreg structure is partially advanced, and wherein the second prepreg structure comprises the resin that begins to flow and react in response to the heating; and heating the first prepreg structure and the second prepreg structure together to form a chemical bond between the first prepreg structure and the second prepreg structure, wherein there is no identifiable interface between the first prepreg structure and the second prepreg structure.

In various embodiments, the method may comprise: heating a first prepreg structure to a first temperature, wherein the first prepreg structure comprises a resin that advances in response to the heating; monitoring the viscosity of resin of the first prepreg structure; applying a second prepreg structure to the first prepreg structure in response to the viscosity increasing within a range, wherein the second prepreg structure comprises the resin; and heating the prepreg structure and the second prepreg structure to the first temperature, wherein the first prepreg structure integrally bonds to the second prepreg structure to form an laminate structure.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1C:
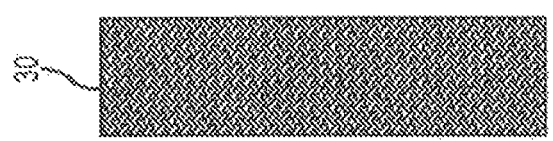
FIG. 1C illustrates a cross-sectional view of a laminate structure, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading and/or crosshatching lines may be used throughout the figures to denote different parts, but not necessarily to denote the same or different materials.

As used herein the term "prepreg structure" may refer to "pre-impregnated" fibrous structures (e.g., glass fibers, carbon fibers and/or the like) that include a material, such as an epoxy and/or binder, between and/or coated on the fibers.

As used herein the term "thick laminate structure" may refer to a laminated composite material having a thickness of at least five inches. The term "thickness" in this context may mean the distance in z direction of the "thick laminate structure." Stated another way, the term "thickness" in this context may mean a direction normal to the largest surface of the "thick laminate structure."

Curing thick prepreg structures may cause a variety of issues (e.g., residual stress, inconsistent thermal loading, and/or the like) not seen when curing thin prepreg structures. Most of these issues are related to the chemical reaction and the boundary conditions present when thick composite structures are joined together. Curing thick prepreg structures may be accomplished by using a controlled approach to the polymerization of the resin from the starting components containing monomers and small oligomers to the final polymerized product. Understanding how the polymerization proceeds and controlling the cure are important in controlling the thermal profile and thus obtaining a consistent, homogeneous material without material gradients and/or inconsistencies through the thickness of the final composite structure.

Curing a thick prepreg structure in one step having an epoxy prepreg system may result in high peak temperatures that are capable of damaging the laminate, and/or causing high residual stresses. The high temperature may be a result of the exothermic nature of the cure and insulation provided when curing thick laminate structures. The temperature increase of the laminate may occur as a result of the heat from the reaction of the A-side and the B-side and the insulation by the surrounding prepreg structure. The technique normally used to mitigate the temperature increase is to lower the initial temperature in an attempt to slow the kinetics of the reaction. This can be successful for some structures and thicknesses of laminates, however, thick laminate structures the insulation may retain the heat load from even a slow reaction rate, which may result in an adiabatic condition at the boundary. For the reasons described herein, typical thick laminate structures are assembled and cured in multiple stages. However, this requires surface preparation and in most cases an adhesive. The surface preparation and adhesive steps may be time consuming and labor intensive. The surface preparation and adhesive steps may also produce a laminate structure that has undesirable properties.

In various embodiments, to generate a thick laminate structure without a high peak temperature and/or adhesive interfaces, a method may be used to control the exothermic nature of the curing process while allowing the epoxy to flow and consolidate. In various embodiments, the method may be use an out of autoclave ("OOA") prepreg. An OOA prepreg may be used in applications where the structure being made is large. For example, structures such as watercraft, submarine, and/or aircraft components may be larger than an available autoclave, making curing without the use of an autoclave more efficient and/or convenient. In that regard, processes described in various embodiments may be conducted in a vacuum environment, for example, vacuum vessels such as a vacuum bag.

Figure 1B:
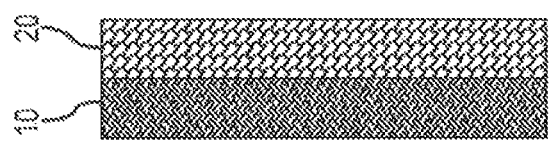
FIG. 1B illustrates a cross-sectional view of first laminate and a second laminate, in accordance with various embodiments.
Figure 1A:
FIG. 1A illustrates a cross-sectional view of first sheet, in accordance with various embodiments.
Figure 2:
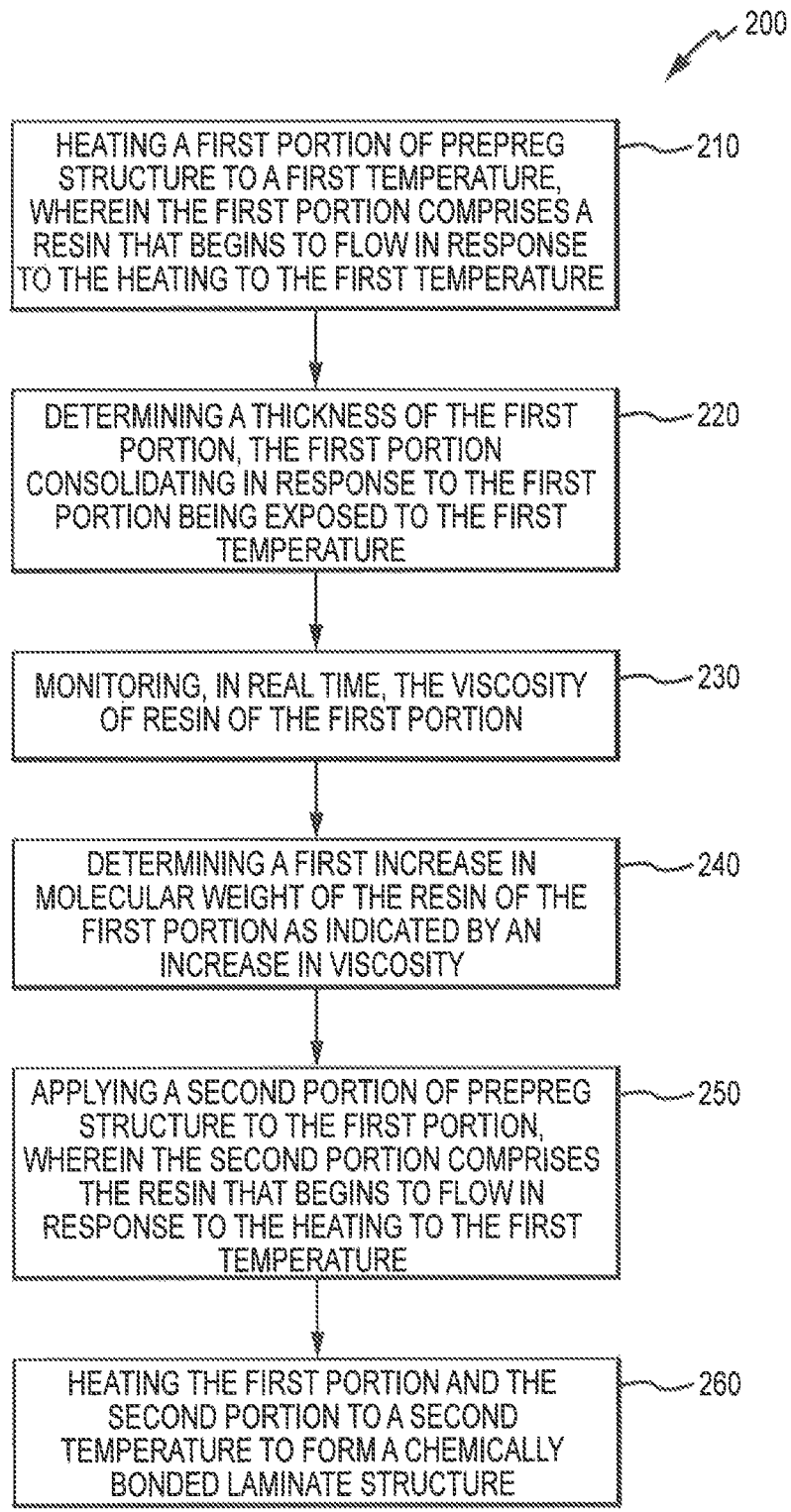
FIG. 2 is a process flow for a first method for forming a laminate structure, in accordance with various embodiments.
Figure 3:
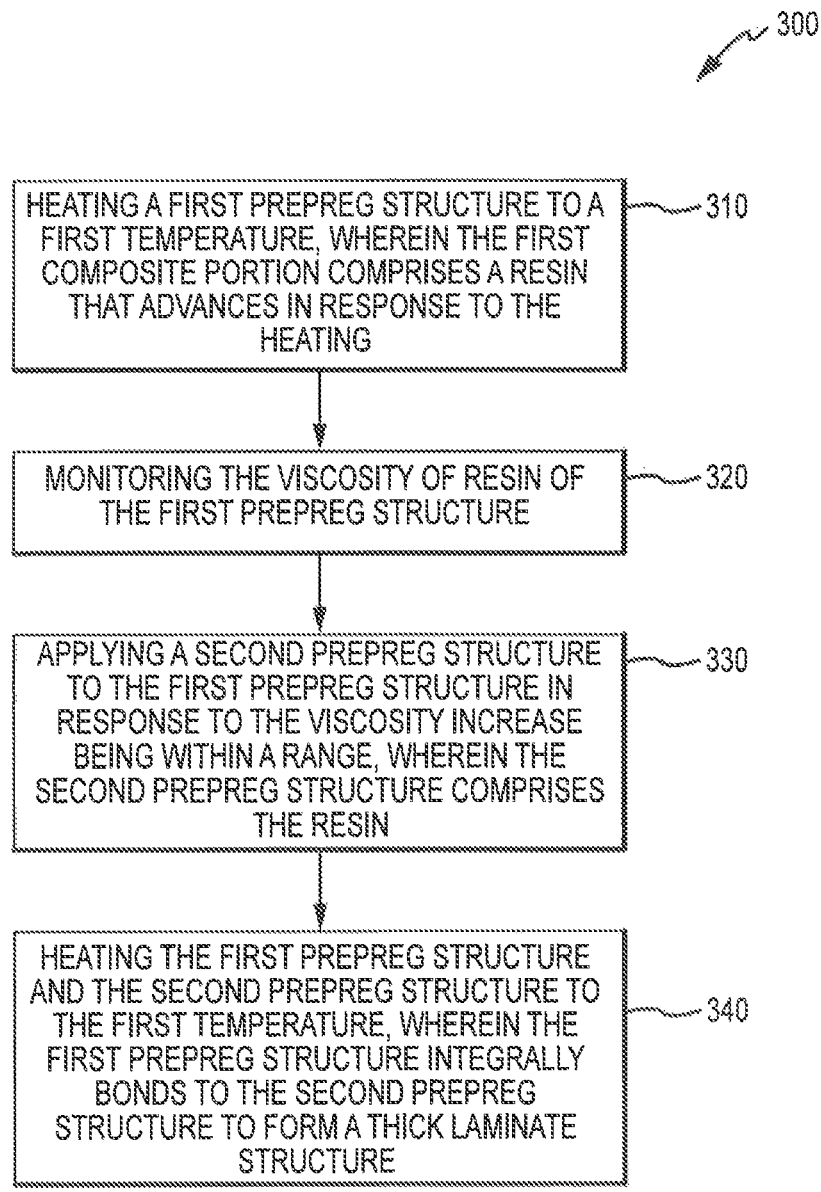
FIG. 3 is a process flow for a second method for forming a laminate structure, in accordance with various embodiments.

In various embodiments and with reference to FIGS. 1A and 1C, a prepreg system may comprise two or more prepreg structures such as for example, first sheet 10 and a second sheet 20. First sheet 10 may be an epoxy resin (e.g., a first resin system) disposed on and/or in a glass woven roving designed to cure at low temperatures. Similarly, second sheet 20 may be an epoxy resin (e.g., a first resin system and/or a second resin system) disposed on and/or in glass woven roving designed to cure at low temperatures. The resin systems of first sheet 10 and/or second sheet 20 may cure in a stepped polymerization process resulting in an increase in molecular weight as the resin systems react with a curing agent. In various embodiments, the first resin system and the second resin system may comprise the same resin or a different resin. Where the first resin system and the second resin system are different, resin systems may react together and/or may be staged to control level of reactivity. In this regard, the first resin system and the second resin system may be compatible and/or have similar reactivity characteristics.

Stated another way, the epoxy resin of the prepreg structure may comprise monomers or short chain polymers which combine to form longer chain polymers in response to application of at least one of heat sufficient to trigger and/or sustain the curing process and a curing agent. The cure can be accomplished with a curing agent or with catalysis. The stepped polymerization may allow the epoxies of first sheet 10 and/or second sheet 20 to be advanced slowly or staged to a molecular weight that is stiff at room temperature, but that may flow when heated. Staging epoxies may be used to make prepreg structure to prevent low viscosity resin systems from flowing off the first sheet 10 and/or second sheet 20. The staging and/or partial resin advancement may also be used to help control the polymerization process in thick laminates and to create thick laminate structures 30. In various embodiments, the thicknesses of first sheet 10 and second sheet 20 sum to at least five inches. However, the thicknesses of first sheet 10 and second sheet 20 individually may comprise any thickness, provided that the other sheet comprises a thickness that would sum to at least five inches. For example, first sheet 10 may be 2.5 inches and second sheet 20 may be 2.5 inches and, for another example, first sheet 10 may be 0.5 inches and second sheet 20 may be 4.5 inches. The thicknesses are determined based on controlling the exothermic reaction and assuring adequate reactivity to chemically bond the layers together.

In various embodiments and with reference to FIGS. 1A-1C and 2, a method 200 for stepped polymerization may allow a user to create a thick laminate structure 30 from two or more sheets (e.g., first sheet 10 and second sheet 20 as shown in FIG. 1B) with no observable interfaces and/or few, if any, inconsistencies in the cured structure, which may otherwise be present in a structure created using a process that uses adhesive and/or surface preparation. Method 200 may comprise partial cure steps of a prepreg structure that can be controlled by controlling the temperature of a sheet of composite material. For example, a first sheet of prepreg structure (e.g., first sheet 10) may be heated to a first temperature (Step 210). As disclosed herein, first sheet 10 may comprises an epoxy and/or resin that begins to flow in response to the heating to the first temperature. The heating to the first temperature may provide a partial curing. The partial cure may advance the resin to a state where the molecular weight of the resin and/or epoxy in first sheet 10 may be high enough that at room temperature the resin is stiff, but the epoxy and/or resin of first sheet 10 may soften and flow when heated and react with the second sheet 20.

In various embodiments, during this partial curing (e.g., a hot debulk) first sheet 10 is heated high enough to consolidate the prepreg lay up (e.g., fabric) to a desired thickness, completely wetting the reinforcement and advancing the resin to a void free system to a point that it is a solid at room temperature. In this regard, method 200 may determine a thickness of the first sheet, where first sheet 10 may consolidate (e.g., a contraction and/or thickness reduction) in response to first sheet 10 being exposed to the first temperature (Step 220).

In various embodiments, method 200 may comprise real time monitoring of the viscosity of resin of first sheet 10 (Step 230). In this regard, method 200 identifies when to terminate the reaction that allows for sufficient resin reaction to have first sheet 10 solid at room temperature, but still comprising sufficient unreacted resin such that resin will flow when heat is added. For example, method 200 may monitor and/or determine the molecular weight of the resin in first sheet 10 (Step 240). Method 200 may further comprise applying second sheet 20 of composite material to first sheet 10 (Step 250). As discussed herein, second sheet 20 may comprise the resin that begins to flow in response to the heating to the first temperature. Advancing the resin in partial cure of first sheet 10 may reduce the reactivity of first sheet 10, which allows for a reduced out time (e.g., time where first sheet 10 is not exposed to heat), reduced "exotherm" (e.g., heat load), and reduced residual stresses in laminate structure 30. In this regard, first sheet 10 is allowed to bond to second sheet 20. As such, method 200 may comprise heating first sheet 10 and second sheet 20 to a second temperature to form a laminate structure 30 (Step 260).

In various embodiments, controlling the cure of a laminate structure 30 and the associated exotherm and residual stresses may require real time management of the curing process. Monitoring the curing process may be accomplished with a dielectric sensor that can monitor the viscosity of first sheet 10 and/or second sheet 20 in real time. Real time measurements of viscosity and the first temperature can identify when the polymerization reaction in first sheet 10 has caused the molecular weight of the resin of first sheet 10 to increase, reducing the viscosity of the resin.

In various embodiments, understanding the behavior of the resin in first sheet 10 and/or second sheet 20 allows method 200 to terminate the point where the partially cured resin of first sheet 10 can still flow when heated and react with fresh resin of second sheet 20 to form laminate structure 30. Successfully accomplishing a chemical mixing and reaction of the partially cured first sheet 10 and second sheet 20 may eliminate the need for surface preparation or adhesives between first sheet 10 and second sheet 20 to form laminate structure 30 that is chemically bonded.

In various embodiments and with reference to FIGS. 1A-IC and 3, a method 300 for stepped polymerization may allow a user to create a laminate structure 30 from two or more prepreg structures (e.g., first sheet 10 and second sheet 20 as shown in FIG. 1B) with no observable interfaces and/or few, if any, inconsistencies in the laminate structure 30, which may otherwise be present in a structure created using a process that uses adhesive and/or surface preparation. Method 300 may comprise heating a first prepreg structure (e.g., first sheet 10) to a first temperature. The first composite portion may comprise a resin that advances in response to the heating (Step 310). In this regard, the resin of first sheet 10 may advance through the reinforcement of the first sheet and partially cure. Method 300 may monitor the viscosity of resin of the first composite portion (e.g., first sheet 10) (Step 320). The viscosity monitoring may occur in real-time. When the viscosity of the resin reaches a point that first sheet 10 is stiff at room temperature, but still has sufficient reactivity to flow at a first temperature at second sheet 20 may be applied. In this regard, prepreg structure portion (e.g., second sheet 20) may be applied to the first prepreg structure (e.g., first sheet 10) in response to the viscosity being within a range (Step 330). The prepreg structure portion (e.g., second sheet 20) may comprise a resin. The resin of second sheet 20 may be the same resin of first sheet 10.

In various embodiments, method 300 may comprise heating the first composite portion (e.g., first sheet 10) and the second portion (e.g., second sheet 20) to the first temperature. In this regard, the first composite portion may integrally bond to the second composite portion to form an assembly (e.g., thick laminate structure 30) (Step 340).

In various embodiments, dielectric sensors may be used to determine the viscosity of first sheet 10 and/or second sheet 20 as described with respect to method 200 and/or method 300. Moreover, thermocouples (TCs) may be used to determine the first temperature and/or second temperature disclosed in method 200 and 300.

Figure 4A:
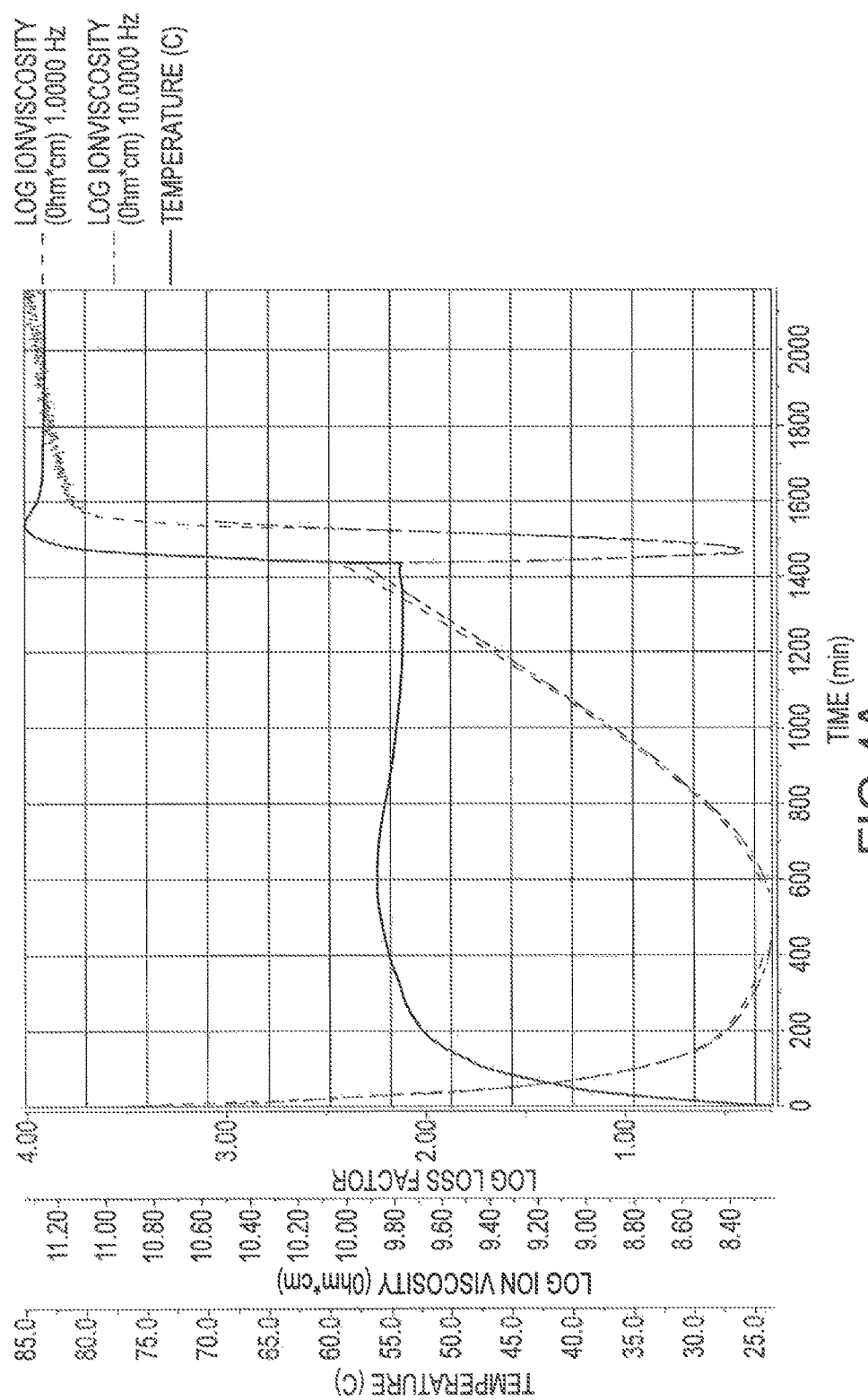
FIG. 4A is a graph illustrating temperature and log ion viscosity in the y axis and time in the x axis, in accordance with various embodiments.
Figure 4B:
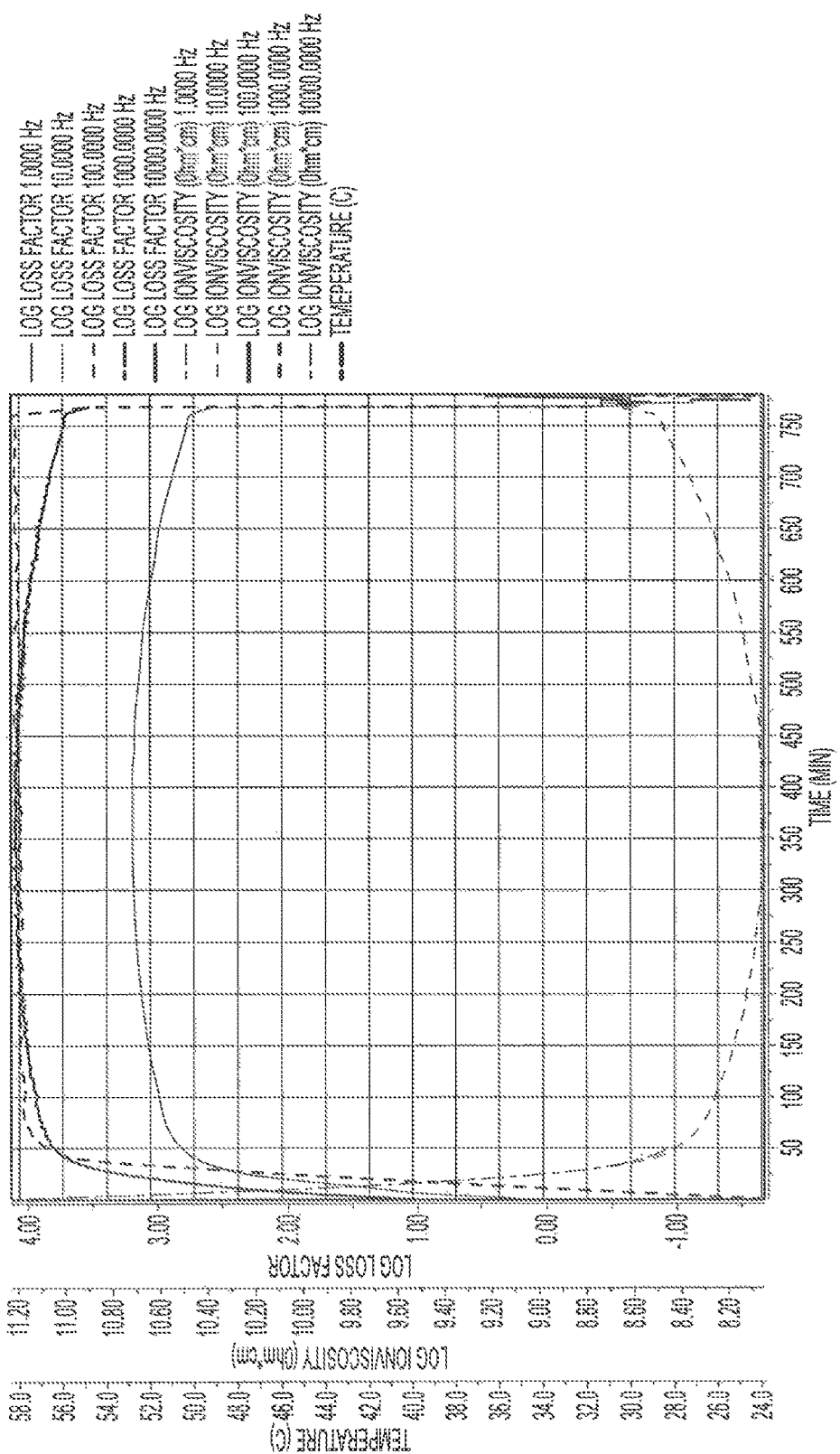
FIG. 4B is a graph illustrating temperature and log ion viscosity in the y axis and time in the x axis, in accordance with various embodiments.
Figure 4C:
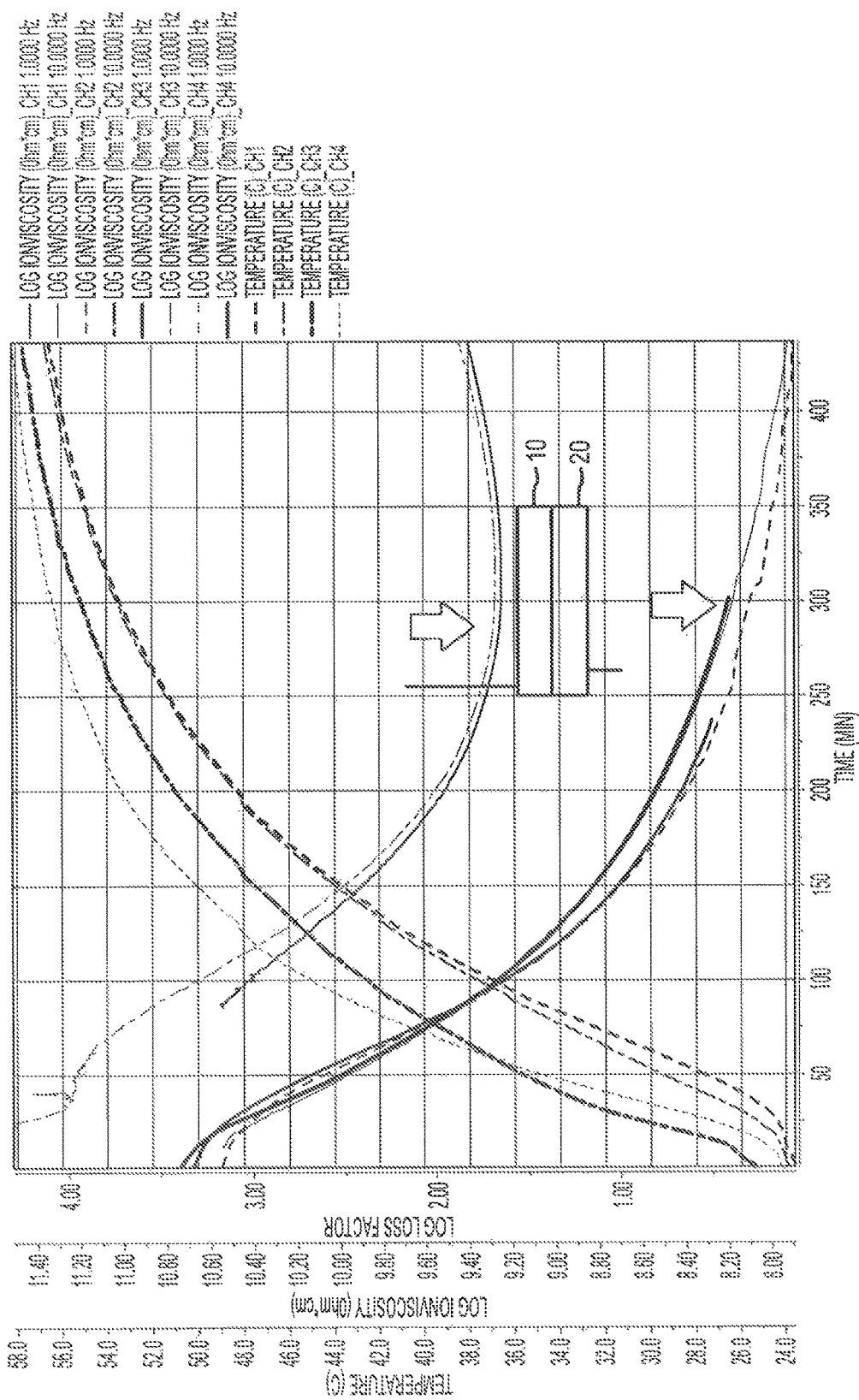
FIG. 4C is a graph illustrating temperature and log ion viscosity in the y axis and time in the x axis, in accordance with various embodiments.

In various embodiments, FIGS. 4A-4C, show the viscosity and temperature versus time of first sheet 10 and second sheet 20. In this regard, the viscosity of the resin of first sheet 10 may be monitored in real-time to determine when the resin has sufficiently advanced (e.g., the viscosity has increased to be within a range and/or to a determined measured level) and/or flowed to be rigid at room temperature, but have sufficient reactivity to bond with second sheet 20.

In various embodiments, the viscosity of first sheet 10 may be monitored. This viscosity may decline overtime to a baseline value and may then increase. In response to the reaching the baseline value and increasing, second sheet 20 may be added to first sheet 10. For example, when the viscosity reaches a range between approximately 0.25 and approximately 0.50 as shown in FIG. 4C (e.g., the viscosity has declined to a baseline value and begins to increase), second sheet 20 may be added to first sheet 10. In this example, the measurement of viscosity may be a unit-less measurement based on the type of measurement system employed.

In various embodiments, thick laminate structure 30 was compared with a test structure to compare the mechanical properties of thick laminate structure 30 to the test structure that was made by a conventional process that included surface preparation and adhesive steps. This test determined that laminate structure 30 made from method 200 and/or 300 improved the mechanical properties of the thick laminate structure 30 over the test structure. More specifically, the test structure tended to exhibit mechanical properties associated with high exotherm and high associated residual stress at the various bonding points where the surface preparation and/or adhesives were applied. Such undesirable mechanical properties were not found in thick laminate structure 30. Moreover, the test structure required long out times associated with layup of the various composite material layers required to make a thick laminate structure.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What I claim is:

1. A method comprising:
   heating a first portion of a prepreg structure to a first temperature, wherein the first portion comprises a resin that begins to flow in response to the heating to the first temperature;
   determining a thickness of the first portion, the first portion consolidating in response to the first portion being exposed to the first temperature;
   monitoring a viscosity of the resin of the first portion;
   determining an increase in molecular weight of the resin of the first portion as indicated by an increase in the viscosity of the resin of the first portion;
   applying a second portion of prepreg structure to the first portion, wherein the second portion comprises the resin that begins to flow in response to the heating to the first temperature; and
   heating the first portion and the second portion to a second temperature to form a chemically bonded thick laminate structure,
   wherein the first portion of prepreg structure is an epoxy resin on glass woven roving; and
   wherein the resin cures in a stepped polymerization process.

2. The method of claim 1, wherein the first portion of prepreg structure is an out of autoclave prepreg.

3. The method of claim 1, wherein the second portion of prepreg structure is an out of autoclave prepreg.

4. The method of claim 1, wherein the second portion of prepreg structure is an epoxy resin on glass woven roving.

5. The method of claim 1, wherein the thick laminate structure is free of interfaces.

6. The method of claim 1, wherein the thick laminate structure is greater than approximately 5 inches, and wherein the think laminate structure comprises at least two prepreg structures.

7. The method of claim 1, wherein the monitoring occurs in real time via a dielectric sensor.

8. A method comprising:
   heating a first prepreg structure to a desired temperature, wherein the first prepreg structure comprises a resin that advances in response to the heating;
   monitoring, in real time, a viscosity of the resin of the first prepreg structure;
   applying a second prepreg structure to the first prepreg structure in response to the viscosity increasing within a range, wherein the second prepreg structure comprises the resin; and
   heating the first prepreg structure and the second prepreg structure to the desired temperature, wherein the first prepreg structure integrally bonds to the second prepreg structure to form a thick laminate structure,
   wherein the first prepreg structure is an epoxy resin on glass woven roving; and
   wherein the resin cures in a stepped polymerization process.

9. The method of claim 8, wherein the thick laminate structure is free of interfaces.

10. The method of claim 8, wherein the thick laminate structure has mechanical properties that are substantially identical to those of the first prepreg structure.

11. The method of claim 8, wherein the first prepreg structure is an out of autoclave prepreg structure.

12. The method of claim 8, wherein the thick laminate structure is greater than approximately 5 inches.

13. A method comprising:
   heating a first portion of prepreg structure to a first temperature, wherein the first portion comprises a resin that begins to flow in response to the heating to the first temperature;
   determining a thickness of the first portion, the first portion consolidating in response to the first portion being exposed to the first temperature;
   monitoring a viscosity of the resin of the first portion;
   determining an increase in molecular weight of the resin of the first portion as indicated by an increase in the viscosity of the resin of the first portion;
   applying a second portion of prepreg structure to the first portion, wherein the second portion comprises the resin that begins to flow in response to the heating to the first temperature; and
   heating the first portion and the second portion to a second temperature to form a chemically bonded thick laminate structure,
   wherein the second portion of prepreg structure is an epoxy resin on glass woven roving; and
   wherein the resin cures in a stepped polymerization process.

* * * * *